US009972141B2

(12) United States Patent
Doval et al.

(10) Patent No.: US 9,972,141 B2
(45) Date of Patent: May 15, 2018

(54) FINISH LINE SENSOR DEVICE

(71) Applicants: Jose Julio Doval, Escondido, CA (US); Kirt Alan Winter, San Diego, CA (US)

(72) Inventors: Jose Julio Doval, Escondido, CA (US); Kirt Alan Winter, San Diego, CA (US)

( * ) Notice: Subject to any disclaimer, the term of this patent is extended or adjusted under 35 U.S.C. 154(b) by 547 days.

(21) Appl. No.: 14/525,617

(22) Filed: Oct. 28, 2014

(65) Prior Publication Data

US 2015/0116497 A1    Apr. 30, 2015

Related U.S. Application Data

(60) Provisional application No. 61/897,746, filed on Oct. 30, 2013.

(51) Int. Cl.
| | |
|---|---|
| *G07C 1/24* | (2006.01) |
| *G01S 13/88* | (2006.01) |
| *G01S 7/41* | (2006.01) |
| *G01S 13/04* | (2006.01) |
| *H04N 7/18* | (2006.01) |
| *H04N 5/232* | (2006.01) |

(52) U.S. Cl.
CPC ............... *G07C 1/24* (2013.01); *G01S 7/412* (2013.01); *G01S 13/04* (2013.01); *G01S 13/88* (2013.01); *H04N 5/23206* (2013.01); *H04N 7/188* (2013.01)

(58) Field of Classification Search
CPC .......... G01S 13/88; G01S 13/02; G01S 13/04; G01S 7/412; G07C 1/24; H04N 5/23206; H04N 7/188
See application file for complete search history.

(56) References Cited

U.S. PATENT DOCUMENTS

| 5,420,903 A * | 5/1995 | Newton ............. A63B 71/0605 |
| | | 377/5 |
| 5,737,280 A | 4/1998 | Kokubo |
| 2010/0099437 A1 | 4/2010 | Moerdijk |
| 2012/0287758 A1 | 11/2012 | Lin |

FOREIGN PATENT DOCUMENTS

| EP | 1666912 | 6/2006 |
| WO | WO 01/00281 | 1/2001 |

* cited by examiner

*Primary Examiner* — Matthew M Barker
(74) *Attorney, Agent, or Firm* — Mark Wisnosky

(57) ABSTRACT

A device and methods of using the device to provide timing and detection of the finish line for a sporting event are described. The device makes use of a Doppler radar transducer to detect the user as they approach and pass the finish line. In some embodiment the device further includes sensors that detect false starts and measure physiological parameters of the user during the event.

11 Claims, 8 Drawing Sheets

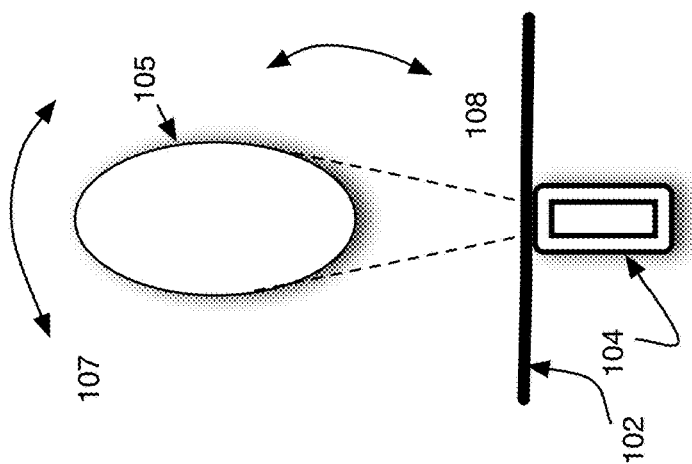
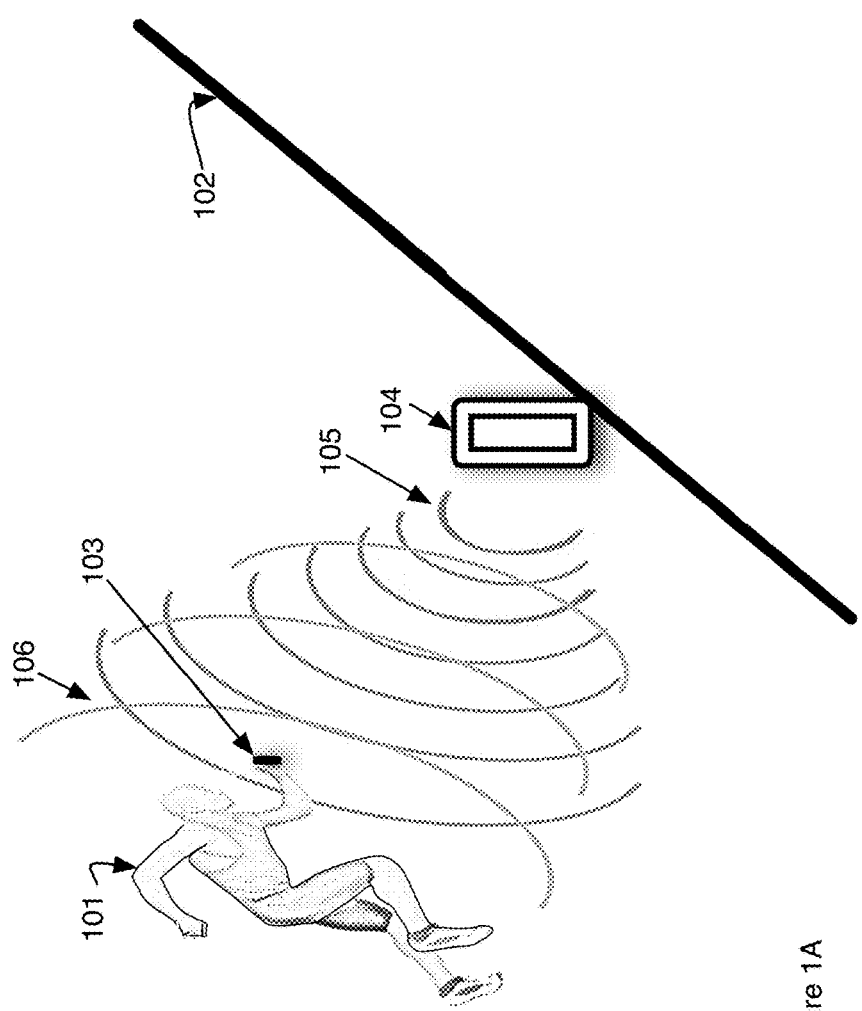

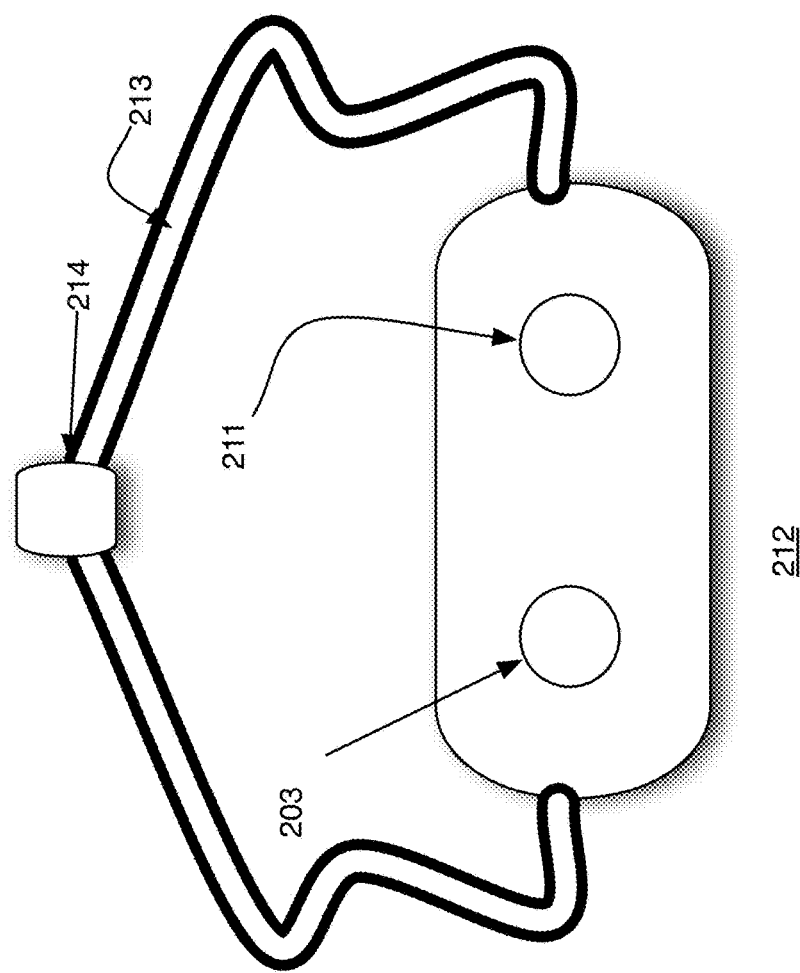

FINISH LINE SENSOR DEVICE

CROSS-REFERENCE TO RELATED APPLICATIONS

Not applicable

BACKGROUND OF THE INVENTION

Technical Field

The present invention relates to sensors used to capture a sporting or other activity and improved analysis of the sensor data. In particular this application describes a finish line sensor for a running event.

Related Background Art

The use of sensors in sports and other activities to make measurements of the athlete's performance are becoming ubiquitous. Radar guns have long been used to measure the velocity of a pitched baseball; sensors on bicycles now measure speed, power output, pedaling cadence and heart rate of the rider and lasers and videos are used to detect the winner in running events. Video is being used to capture the swing motion of batters, golfers, finish events and tennis players. Slow motion replay of a baseball pitcher's motion or a batter's swing has been used for entertainment, instruction and training. Sensors and analyses of sensor data are used in a wide variety of sports and activities including for example: baseball, golf, tennis and other racket sports, football, gymnastics, dance and for help in rehabilitation of the people who have lost limbs and are learning how to walk or perform other activities with prosthetics.

Virtually all athletic skill development is an iterative process. One must perform a task, measure the outcome of the task and then analyze one's technique in order to improve. If any of these steps are missing in a training environment, this at best hinders the development of the athlete and at worst, prevents it. Young athletes who strive to compete at the highest levels in their sport are generally very self-motivated. They are the ones who work hardest during practice, stay after practice for extra repetitions and often train alone. Measurement is one of the key feedback mechanisms for specific skill development. In basketball, one can compute their shooting percentage for example while training alone. For many athletes, their time in a given race distance is used as a measure of training effectiveness and has been found to relate to their performance in a variety of sports. Basketball, soccer and football are obvious sports where speed and endurance are required.

The traditional and still used method for measuring time in a practice race event is to have a second person time the runner. Typically the second person counts down to start, starts a stopwatch and stops the stopwatch at the finish. This usually means that the starter may be a fair distance from the runner. In competition multiple people are used to time a single event. A starter counts down and begins the race multiple timers with stopwatches time the race and results are often averaged or otherwise sorted from multiple timed results. Technology has been applied to the problem through the use of electronic signals to start the race and a laser or light detector at the finish line. These still require electronic contact whether wired or wireless between the starting line and the finish. Errors in the manual measurement are common as actuating a timepiece at the start and finish require a human reaction. Electronic timing, while more accurate, is not readily amenable to an athlete working out alone. Additional measurements of for example energy and power made during the course of a run are not generally available. Inaccuracies in measurements of single events are common. Automatically capturing data related to speed and acceleration during an event is an important missing attribute of current systems. Sensors are often gathering data continuously. Yet the event of interest in the performance of the athlete may be just a few seconds or even fractions of a second buried in a mountain of continuous data. If the sensor is an image sensor for example, a coach or the athlete may sort through the image file to edit down to the time of interest. However this editing may not be readily available if the sensor is that of a radar gun or a heart rate monitor or other such device. A means is needed to sort and select the data of interest that is relevant to performance.

Often there is information that if available to a system analyzing sensor data could improve results. For example a video sensor might be able to capture technique through the course of a run, an accelerometer sensor might provide information regarding the forces and acceleration at different points in a run. A means is needed to make use of multiple sensor input to improve measurement results.

Systems are needed that can repeatedly capture instances of a sporting activity including input from a variety of sensors, make measurements of the outcome of each instance of the activity, automatically synchronize the multiple inputs and analyze each instance so that the athlete can compare actions with other athletes as well as their own results of multiple attempts or instances.

DISCLOSURE OF THE INVENTION

A system is described that addresses the deficiencies described above. A sensor system is described that includes a handheld device that a runner, practicing alone, can use to begin a countdown start signal and trigger a time at the start of a run. A second sensor located at a finish line can detect the runner passing and through communication with the handheld device trigger the time to capture the finish point. In one embodiment the handheld device need not be in communication with the finish line at the start of the event and yet is still able to accurately time the event. In another embodiment the starting device may be positioned at the start and the runner need not carry any device with them during the event. In another embodiment secondary sensors detect false starts or the runner leaving too early or unreasonable late. In another embodiment the system detects quickness of the start. In another embodiment the secondary sensors provide additional information regarding energy and power exerted by the runner during the event.

BRIEF DESCRIPTION OF THE DRAWINGS

FIG. 1A is a diagram showing basic components in use.

FIG. 1B shows the distribution of energy broadcast from the second electronic component.

FIG. 2B is a block diagram of a second embodiment of the first electronic component.

MODES FOR CARRYING OUT THE INVENTION

Figure 2A:
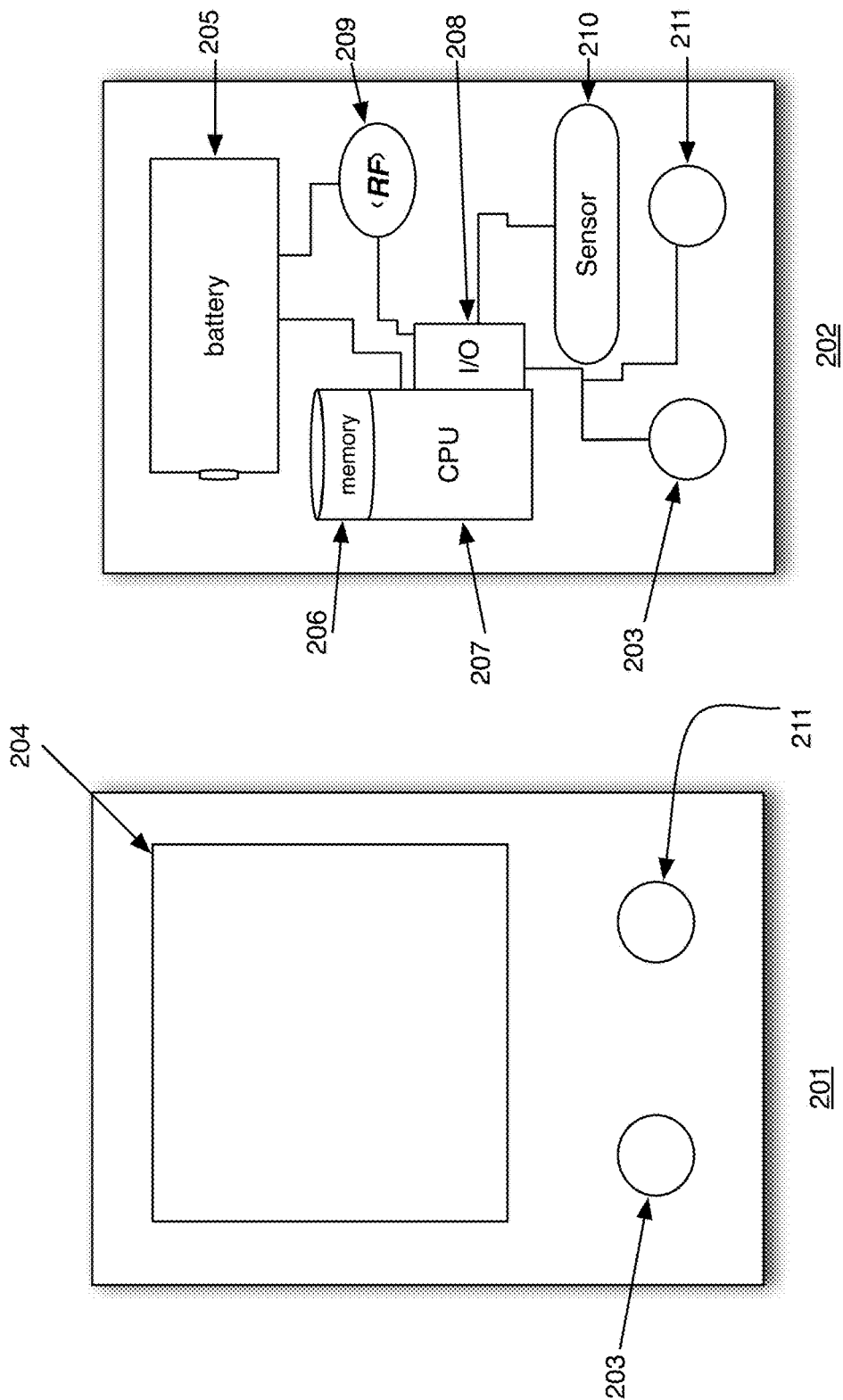
FIG. 2A is a block diagram of a first electronic component used of the invention.

Referring to FIG. 1, the basic devices and use of the invented system are shown. A runner 101 is running towards a finish line 102 and carrying a first electronic device 103. A second electronic device 104 is located at the finish line and sends out a radar signal 105 that is reflected off the runner 106 and further detected by the second electronic device at the finish line. The first device 103 is used to start the run. In one embodiment it provides a countdown start for the runner. In another embodiment the first electronic component further determines the quickness of the start. Quickness of the start is defined by the lapse of time between the time of the start signal to the runner and the time the runner actually starts running. The shorter the lapse the quicker the start. In another embodiment the first electronic device provides a randomly varied start signal to the runner. A randomly varied signal prevents the runner from anticipating the start signal and artificially improve their quickness of start.

A timer within the first device marks the beginning of the run. In one embodiment at the time the run is started, it need not be in electronic contact with the second device at the finish line. Once the runner is detected by the second device as the reflected signal from the runner, the second device notes a first time point and synchronizes the timer in the second device with the timer in the first device that started at the start of the run. Communication is through wireless to the first device. Non-limiting examples are a radio frequency communication or infrared communication. The second device continues to record the reflected signal from the runner and once he has passed the second device the signal disappears. The second device then logs a second time. The finish point in time is between the first time and the second time. The exact point in time of the finish is determined through analysis of the reflected signal from the runner. In the preferred embodiment the finish is determined as the maximum of the signal strength of the reflected signal between the first point of detecting the runner and the second point of the signal returning to baseline after the runner passes. Since the timer in the first and second device are synchronized when the runner is first detected, the total time from the start of the run to crossing the finish line is calculated from the timing data in the first handheld device. In another embodiment the first device further includes an accelerometer that detects movement of the runner at the start of the run and therefore determines whether the runner started immediately after the countdown timer or had a false start by starting before the countdown timer or even did not start at all even though the countdown timer had lapsed. False starts and non-starts can be detected. Although throughout the disclosure the use of the device is described in relation to a runner. It should be clear that the device could also be used to time and detect finish line in a variety of situations. In one embodiment the device is used in conjunction with running. In another embodiment the device is used in conjunction with cycling. In another embodiment the device is used in conjunction with horse racing. In another embodiment the device is used in conjunction with motor sports. The device and methods of use described herein apply equally to all such use embodiments.

Referring to FIG. 1B the orientation of the second electronic component 104 is shown. The radar signal 105 is not emitted symmetrically. The energy distribution has an ovoid shape with the long access of the ovoid oriented vertically. The device 104 is aimed such that the vertical angle 108 is adjusted to maximize the reflection and signal from the runner and the horizontal angle 107 is optimized to maximize the signal from the runner and simultaneously minimize reflected signal from extraneous objects (not shown). Extraneous objects may include non-targeted runners.

Referring now to FIGS. 2A and 2B the first electronic component that comprises the finish line sensor device is shown. The first electronic component is located either on the user or at the start line and the second electronic component is located and marks the finish line. A front panel image 201 and a second view 202 of the components within the device are shown. The front panel is comprised of a user interface 203 a screen 204 and an alert 211. The user interface shown as a single button 203 in this embodiment is a thumbwheel, a keypad and multiple buttons in other embodiments. The user interface allows the user to enter user preferences and to initiate the start sequence of the device. The screen 204 acts both as an alert to the user and also presents timing and other results visually to the user. Non-limiting examples of the screen include a liquid crystal display and a light emitting diode display, as are known in the art. In one embodiment the screen is eliminated and the first component is as shown in FIG. 2B. Results are displayed on a computing device in communication with the first component 212. Non-limiting portable computing devices for display of results include cellular telephone devices and tablet computers. The first electric component further includes an alert 211. In a first embodiment the alert 211 is a sound device to alert the runner to the start of a running event. In one embodiment the alert is a speaker. In another embodiment the alert is a buzzer. In another embodiment the alert 211 further includes a vibrating device that alerts the user by a vibration. The second view 202 of FIG. 2A shows the internal components of the first electronic device. In a preferred embodiment the device is comprised of the user interface 203, a battery or other energy storage device and regulated power supply 205, a computing device including a processor 207, memory 206, input/output port 208 and a display (not shown in view 202). The first electronic component further includes a clock or timing device (not shown). The timing device may be incorporated into the computing device or located external to the computing device. The device is further comprised of a port 209 for communication to other devices and in a preferred embodiment an accelerometer 210. The communication port both sends and receives external communication signals and may be wired or wireless and may communicate via radio frequency and optical transmissions. The memory 206 includes stored program steps, discussed later, that enable the processor to automatically time an event. The interconnections between the components allow the processor 207 to receive inputs from the user interface 203, the accelerometer 210 and the communication port 209 and send signals out to the display (not shown in view 202), the alert component 211 and the communication port 209. The battery and regulated power supply 205 provides power to all the electronic components include in the first electronic device. In one embodiment the communication port 209 is a wireless port. In another embodiment the communication port is a wired port such as a universal serial bus port. In another embodiment the communication port 209 is an infrared transceiver. In another embodiment, not shown, the first component does not include an accelerometer. In another embodiment the sensor 210 is at least one selected from a group of sensors including those for detecting acceleration and physiological parameters of the user. Non-limiting examples of physiological sensors include a heart rate monitor, an electrocardiogram, a respiration rate sensor, and a body temperature sensor.

Referring to FIG. 2B in another embodiment the first electronic component is comprised of the same internal electronic components as shown in FIG. 2A except that there is no display. The external view of this embodiment 212 shows a user interface 203 and an alert 211. In another embodiment the first component further includes a strap 213 and a buckle 214 such that the device can be worn on the body of the user. In one embodiment the device straps around the chest of the user and monitors physiological parameters during a run as well as providing timing and finish line detection functionality.

Figure 3:
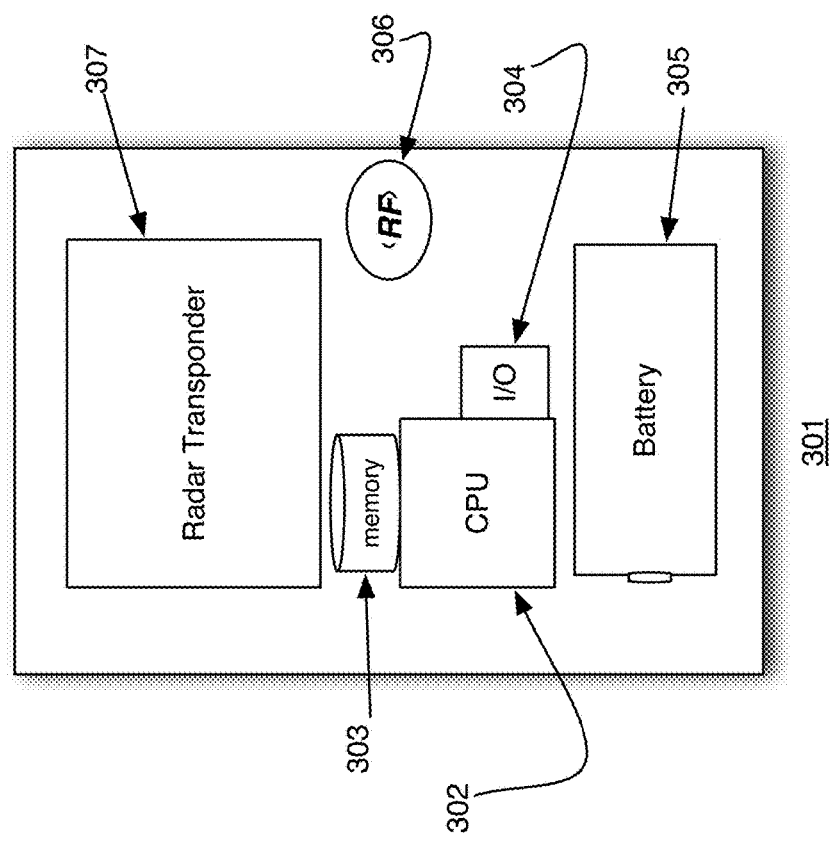
FIG. 3 is a block diagram of a second electronic component of the invention used at the finish line.

Referring now to FIG. 3 a second electronic component of the finish line sensor device is shown the view 301 shows the internal components of the second electronic component. The first electronic component is located either on the user or at the start line and the second electronic component is located and marks the finish line. The second electronic component is comprised of a processor 302 with memory 303. The memory includes programmed instructions for operation of the processor 302 and can store data acquired during the running event for analysis of the finish time as discussed below.

The processor further has an input/output port 304 that communicates with other components of the system. The second electronic component further includes a clock or timing device (not shown). The timing device may be incorporated into the processor or located external to the processor. The second electronic component further includes an energy storage device and regulated power supply 305 to supply power to the processor and other components of the second electric component. There is also a communication port 306 that enables communication with the first electronic component already described as well as other external electronic devices. In a preferred embodiment the communication port 306 uses wireless communication protocols. In one embodiment the wireless communication is through radio frequency communication. In another embodiment the communication port uses infrared radiation for communication. The second electronic component further includes a radar transducer 307 that sends a radio frequency signal towards the user and receives a reflected radio frequency signal reflected off the user as they approach the finish line where the second electronic component is located. In a preferred embodiment the transponder and the processor are programmed to provide a Doppler radar signal as the user approaches the finish line location of the second electronic component. The radar transducer also includes an analog to digital converter to provide a digitized signal of the reflected radar signal to the computing device. The computing device is capable of storing the digitized signal and analyzing the digitized signal.

Figure 4:
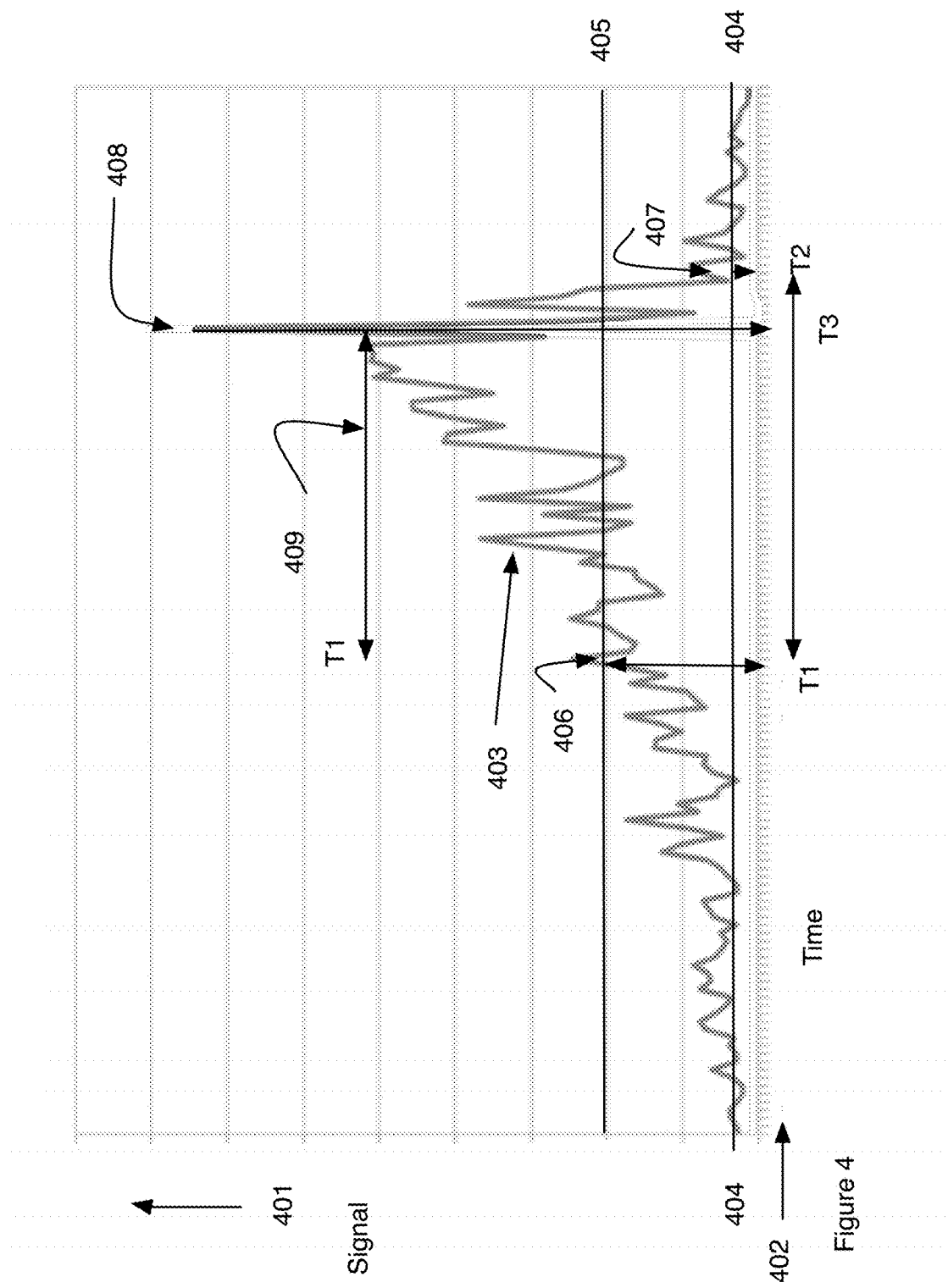
FIG. 4 is a chart of output signal of the second electronic component as used to detect a user passing the finish line.

Referring now to FIG. 4, a typical digitized signal received by the second electronic component located at the finish line is shown. The Y-axis 401 is signal strength and the X-axis 402 is time. The time interval shown is just that as the runner/user approaches the finish line. Early in the running event the runner may be far from the second electronic component and the signal represents a baseline level 404. As the user approaches the device the reflected radar signal increases until it exceeds a pre-selected value 405 at which point a first time marker T1 406 is noted. In one embodiment the second electronic component sends an electronic communication at T1 noting the time and thereby synchronizing the clocks of the first electronic device and the second electronic device The signal 403 continues to rise as the user approaches the finish line and then passes the second electronic component located at the finish line. The signal returns to base line 404 at a second noted time T2 407. This time is also noted by the second electronic component. At that point in time the user passed the finish line and the finish time is between T1 and T2. In one embodiment the processor is programmed to store the signal data 403 between the points T1 and T2 and once T2 is established to analyze the stored data to determine the point in time T3 408 that the user crossed the finish line. In one embodiment the finish time T3 is determined as the maximum point in the signal 403 found between the points T1 and T2. Once the endpoint T3 is determined the time 409 from T1 to the endpoint is calculated and sent from the second component to the first. The first component having been started at the beginning of the running event and synchronized at the occurrence of T1 can therefore calculate the elapsed time start to finish of the running event.

Figure 5:
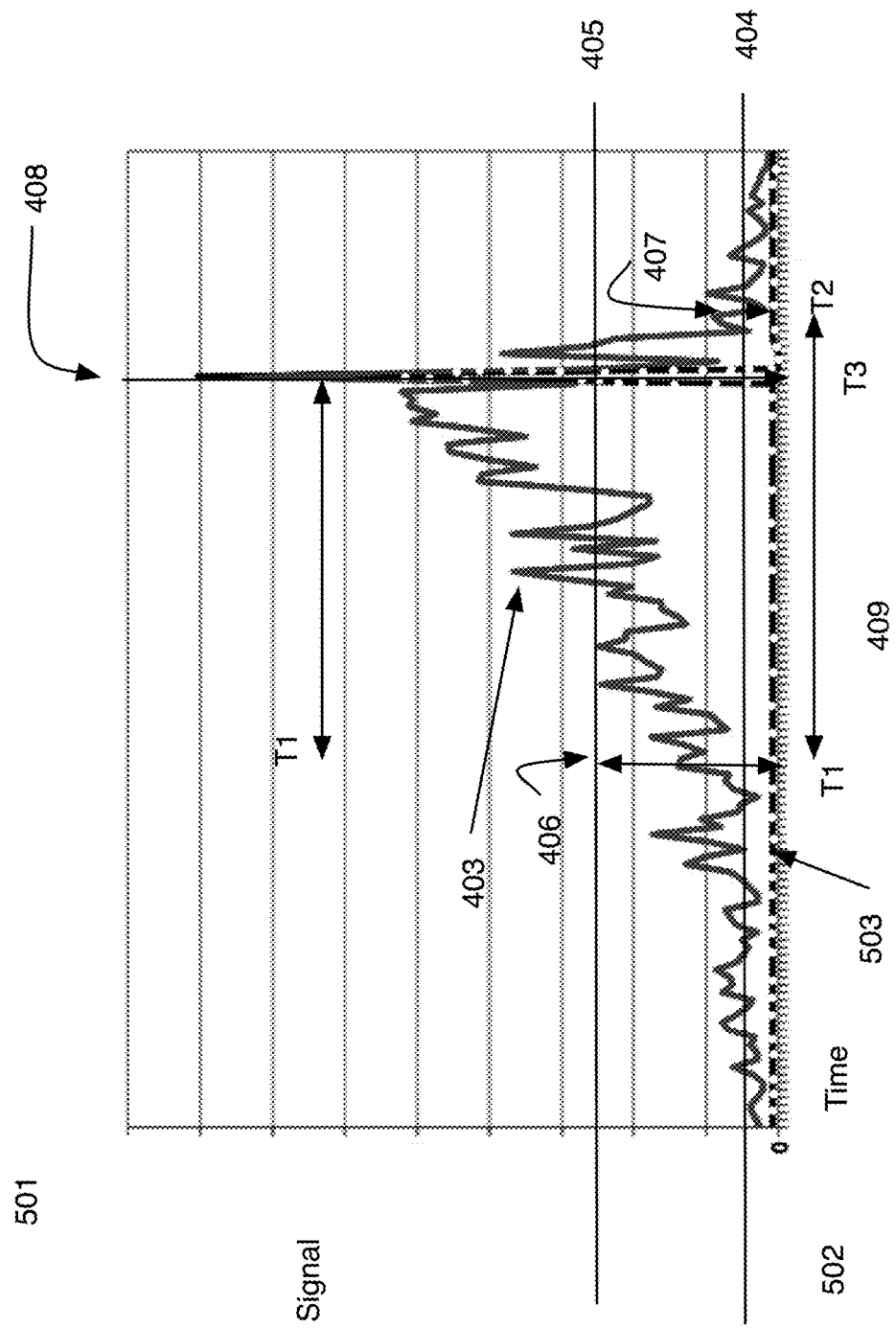
FIG. 5 is the chart of FIG. 4 with an overlay of a laser detector prior art for comparison.

Referring now to FIG. 5 a comparison of the endpoint determination of the current invention with that of a prior art laser system is shown. The X-axis 502 is time and the Y-Axis 501 is the signal from the current invention as previously shown in FIG. 4 as well as the signal 503 from a system where an optical (laser) signal is used. The peak in the laser signal is seen to coincide with the peak signal from the current invention 408. The other features 404-409 shown in FIG. 5 are as already discussed in relation to FIG. 4.

Figure 6:
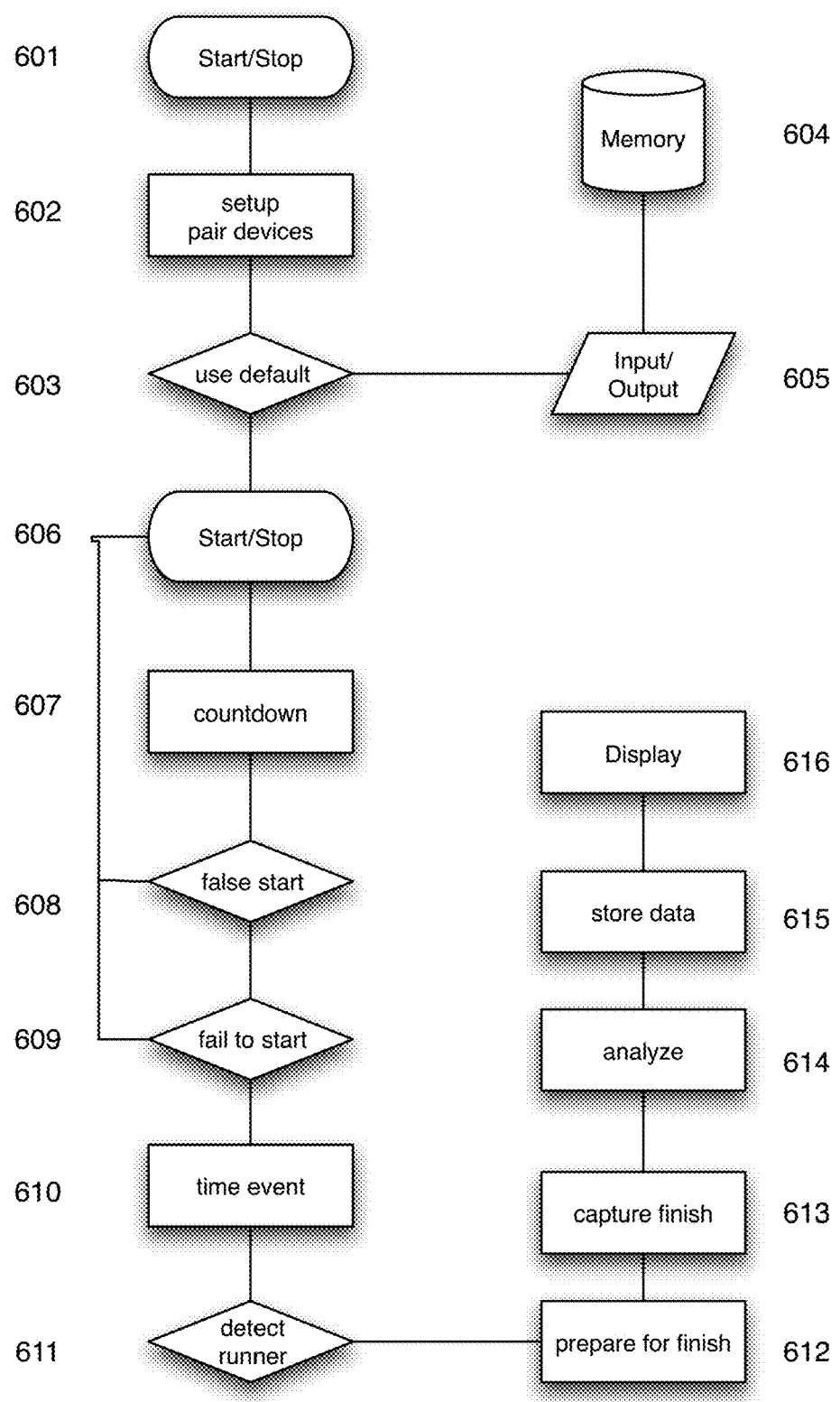
FIG. 6 is a flow chart of the setup, use and data analysis.

Referring now to FIG. 6 a flow chart showing an embodiment of using the device described in the previous Figures is shown. The user begins the process 601 with pairing 602 the first electronic device and the second electronic device. The user decides 603 whether to use default settings that are stored 604 in the memory of the device and loaded 605 or use custom settings. Custom settings include whether to store data from multiple running events to memory, whether a user login is required for devices that are shared amongst multiple users and personal limits on physiological data that can set alarms for example if respiration, heart rate or electrocardiograph data exceeds pre-determined limits. Custom settings also include whether tests are done for false starts and non-starts. In some use cases the first electronic device is carried on the user body and false starts can be detected through use of an accelerometer. In other use cases the first electronic device remains at the starting line and the accelerometer therefore cannot detect a false start or non-start and physiological data would not be available from sensors built into the first electronic device. After the decision 603 regarding user settings the user activates 606 the first electronic device and a countdown 607 is initiated. The countdown ends with a prompt for the user to begin a running event. The user then starts the run. In one embodiment a test 608 is made for a false start. A false start is one where the runner begins the run prior to the end of the countdown: the user "jumps the gun". In one embodiment the accelerometer is used to detect motion of the user to test for a false start. Acceleration prior to the end of the countdown is an indicator of a false start. In another embodiment where the second electronic device is located sufficiently near the start line to detect the runner a false start is detect by motion detected by the Doppler radar of the second electronic device located at the finish line. In another embodiment a check 609 is made for failure of the runner to start. This is one where the runner does not start moving even after the completion of a countdown and an alert to the runner. In one embodiment a failure to start is detected when no motion of the user is detected even after a pre-selected time has lapsed after the end of the countdown and alert to the runner. In one embodiment the pre-selected time is sent in the user preferences setup 602, 603. In another embodiment user preferences include turning on or off the detection of false starts and no starts. After the completion of the countdown and the user starts without detection of a false start or no start the event is timed 610. The timer located within the first electronic device is begun to track the duration of the running event. In one embodiment tracking the event is storage of the time that the event begins. i.e. noting a time zero. In another embodiment time event 610 further includes collection of physiological or other data from additional sensors incorporated in the first electronic device. Non-limiting examples as discussed earlier include accelerometers, heart rate monitors, electrocardiogram data and respiration rate. The user proceeds to approach the finish line and is detected 611 by the second electronic device. A time is noted (T1 in FIG. 4) and in one embodiment the time of detection of T1 triggers the second electronic device at the finish line to send 612 an electronic communication to the first electronic device located on the user or in some embodiments still located at the starting point and the time of T1 is noted relative to the start time. The first electronic device therefore has the information to calculate the elapsed run time from T0 to T1. The user proceeds past the finish line and the radar signal from the runner returns to a baseline condition indicating the user has passed the finish line and the second electronic device stores 613 data from the time of T1 to the time of this detecting a return to baseline noted in FIG. 4 as T2. The reflected radar data between T1 and T2 is analyzed 614 to determine the finish (T3 in FIG. 4). The time of the finish is stored 615 and in transmitted to the first electronic device that then calculates the time from T0 the start to T3 the finish or the elapsed time of the run and displays 616 the time of the running event to the user. In one embodiment the display is on an internal display of the first electronic device. In another embodiment display 616 means transmitting the result to another electronic device for display. Non-limiting exemplary other electronic devices for display include a smart phone, a tablet computer, a portable computer. In another embodiment the display 616 does not take place until the first electronic device is coupled with a second computing device. In another embodiment analyze 614 and store data 615 further includes synchronizing data from additional sensors incorporated in the first electronic device and collected during a running event with the time line of the event. Non-limiting examples of such data include providing acceleration and velocity data throughout the run, heart rate, electrocardiogram and other data all collected during the run. In another embodiment store data 616 further includes storage of time and or other sensor data as an historical record for comparison of results and progress over time. In another embodiment the decision to store additional historical data is included in the setup parameters 602, 603.

Figure 7:
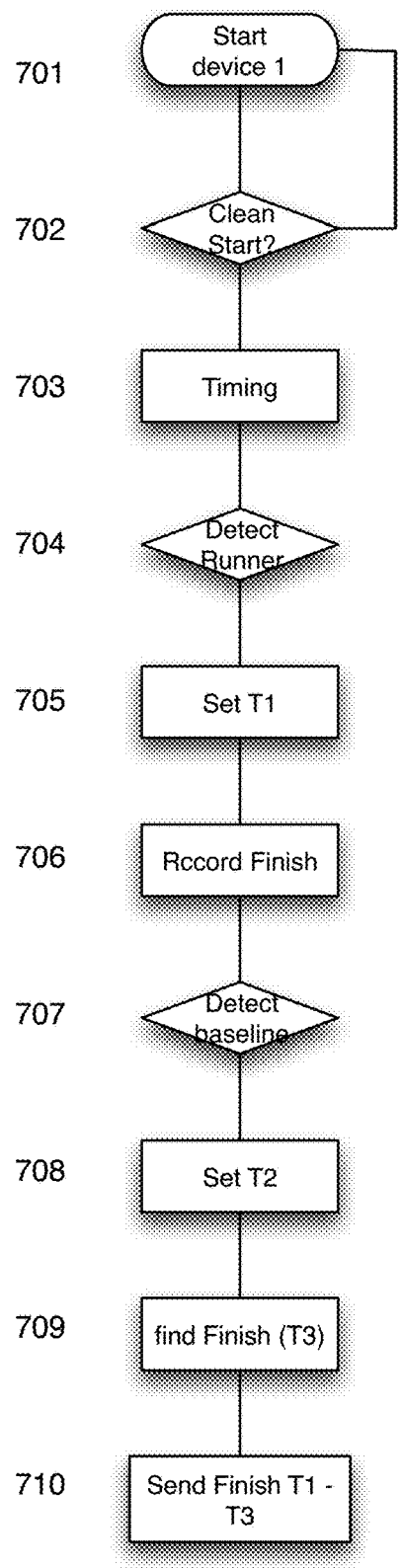
FIG. 7 is a flow chart of more detail of the data analysis.

Referring to FIG. 7, more detail of detecting timing during a running event is shown. The user starts 701 the first electronic component, which initiates a countdown timer and an alert to begin running. In another embodiment the start alert is delayed by a random small time period to prevent the runner from anticipating the start. In one embodiment a clean start is detected 702. A clean start means that the user was not detected leaving early and that the user was detected as leaving the start line after the countdown. In one embodiment the clean start is detected through use of an accelerometer incorporated in the first electronic device. If a clean start is detected timing 703 is initiated. In one embodiment timing implies storage of a time T0 that represents the start of the event. In another embodiment the first electronic component further stores a measure of the quickness of the start. In one embodiment quickness is measured as the time between the time of the start alert and the time acceleration of the runner is detected. In one embodiment T0 is a time point of an internal clock running in a processor located in the first electronic device. In another embodiment timing 703 implies triggering a separate timing device located in the first electronic component. The runner proceeds towards the finish line and when detected 704 by the second electronic component located at the finish line a time T1 is set 705. In one embodiment setting T1 includes sending an electronic communication from the second electronic component at the finish line to the first electronic component. After setting T1 the reflected radar signal from the user is recorded 706 until the signal returns to a baseline level 707 and a time point (T2 of FIG. 4) is noted. 708. The reflected radar signal between T1 and T2 is analyzed 709 to find the finish point. In one embodiment the finish point T3 is determined as the maximum value of the reflected radar signal located between T1 and T2. The second electronic component then sends 710 an electronic communication of the time of T3 relative to the time of T1 to the first electronic component and the first electronic component then calculates the elapsed time of the running event or the time from T0 to T3.

SUMMARY

A device and methods of using the device to provide timing and detection of the finish line for a sporting event are described. The device makes use of a Doppler radar transducer to detect the user as they approach and pass the finish line. In some embodiment the device further includes sensors that detect false starts and measure physiological parameters of the user during the event.

Those skilled in the art will appreciate that various adaptations and modifications of the preferred embodiments can be configured without departing from the scope and spirit of the invention. Therefore, it is to be understood that the invention may be practiced other than as specifically described herein, within the scope of the appended claims.

What is claimed is:

1. A finish line sensor device comprising:
   a) a first electronic component, said first electronic component comprising:
      i) a processor with a timing clock,
      ii) a user interface to interact with the processor,
      iii) a prompting device, said prompting device at least one selected from: a sound emitting device, a vibrating device, a light emitting device and a display device,
      iv) memory, having program steps stored therein to control the processor, said programming steps including instructions to begin a countdown timer when activated by the user interface, to prompt a user by the prompting device, and to store a starting time and an elapsed time, to receive an electronic communication from a second electronic component, said communication including a first time synchronization and a second time of the user passing a finish line, and a calculation step to calculate the time from the starting time to the time the user passes the finish line, v) a communication port to send data and commands to and from the processor
b) the second electronic component comprising:
i) a processor with a timing clock,
ii) a communication port to send data and commands to and from the processor,
iii) a radar transducer configured to transmit a radar signal, receive a reflected radar signal and provide a digitized signal of the radar signal to the processor in the second electronic component,
iv) memory, having digitized data and program steps stored therein to control the processor, wherein the program steps include instructions to compare the intensity of a reflected digitized radar signal with a pre-selected value and when the pre-selected value is exceeded to send the electronic communication to the first electronic component, said communication including the first time synchronization, to store the digitized radar signal after the first synchronization time, and, to analyze the digitized radar signal for a return to a baseline value and at that time record a baseline time, and analyze the stored digitized radar signal to detect a finish time between the first synchronization time and the return to a baseline time and send a communication to the first electronic component of the time of the finish time,
wherein the first electronic component is located at a starting point and the second electronic component is located at a finish line.

2. The finish line sensor device of claim 1 wherein the program step to analyze the digitized radar signal to detect a finish time includes finding a maximum of the intensity of the reflected digitized radar signal between the first synchronization time and the return to baseline time, and, recording the maximum as the finish time.

3. The finish line sensor device of claim 1 further including an accelerometer, and, the programming steps of the first electronic component further including detecting a false start based upon acceleration detected by the accelerometer prior to completion of the countdown timer and prompt of the user.

4. The finish line sensor device of claim 1 further including an accelerometer, and, the program steps of the first electronic component further including detecting the quickness of the start based upon the time lapse between acceleration detected by the accelerometer the prompt of the user.

5. The finish line sensor device of claim 1 wherein the first electronic component is worn on the user's body, and, the first electronic component further includes electronic sensors to measure physiological properties of the user, and, the program steps of the first electronic sensor include storing measured physiological properties, and, synchronizing the time of the measurement of the physiological properties with the start time and the elapsed time.

6. The finish line sensor of claim 1 wherein the radar signal is ovoid in shape with the long access of the ovoid oriented vertically.

7. A method of timing a race event comprising:
a) prompting a user of the start of the race event,
b) recording a first time event in memory of a first electronic device,
c) detecting movement of the user by a second electronic device, said second electronic device located at a finish line for the race event, and, said second electronic device emitting a radar signal that is reflected off the user, and, detecting a reflection of the radar signal from the user,
d) upon detecting the movement of the user by the second electronic device, sending a time synchronization signal to the first electronic device, and, recording the time of the time synchronization signal as a second time event,
e) measuring the intensity of the reflected radar signal from the user,
f) determining by the second electronic device, a point in time after sending the time synchronization signal when the intensity of the reflected radar signal from the user falls below a pre-selected level and storing said point in time as a third time event,
g) storing the intensity of the reflected radar signal over the time period between the second time event and the third time event,
h) analyzing the stored intensity between the second time event and the third time event to determine the time where the intensity of the reflected radar signal reaches a maximum and recording the point in time of the maximum as a fourth time event,
i) calculating the lapsed time between the first time event and the fourth time event and reporting said lapsed time as the time of the racing event from start to finish.

8. The method of claim 7 further including measuring the acceleration of the user by an accelerometer included in the first electronic device.

9. The method of claim 8 further including detecting a false start based upon acceleration detected by the accelerometer prior to prompting the user of the start.

10. The method of claim 8 further including detecting a quickness of a start based upon a time lapsed between prompting the user of the start and detecting acceleration by the accelerometer.

11. The method of claim 7 further including recording physiological properties of the user by the first electronic component worn on the user's body and the first electronic component further including electronic sensors to measure physiological properties of the user and synchronizing the time of the measurement of the physiological properties with the start time and the elapsed time.

* * * * *